United States Patent [19]

Klug et al.

[11] Patent Number: 4,985,263

[45] Date of Patent: Jan. 15, 1991

[54] COATING METHOD FOR FROZEN CONFECTIONERY PRODUCTS

[75] Inventors: David M. Klug, Fulton; Vernon R. Merz, Hannibal, both of N.Y.

[73] Assignee: Nestec S.A., Vevey, Switzerland

[21] Appl. No.: 444,011

[22] Filed: Nov. 30, 1989

[51] Int. Cl.$^5$ ............................. A23B 4/10; A23F 3/00
[52] U.S. Cl. ..................................... 426/302; 426/87; 426/101; 426/303
[58] Field of Search ................. 426/302, 303, 101, 89, 426/100, 95

[56] References Cited

U.S. PATENT DOCUMENTS

| | | | |
|---|---|---|---|
| 1,901,394 | 3/1933 | Hassell | 426/101 |
| 2,048,364 | 7/1936 | Willems | 426/101 |
| 3,141,779 | 7/1964 | Podebradsky et al. | 426/303 |
| 3,752,678 | 8/1973 | Jenkison et al. | 426/302 |
| 3,991,218 | 11/1976 | Earle et al. | 426/303 |
| 4,066,796 | 1/1978 | Mckee | 426/95 |
| 4,086,370 | 4/1978 | Olds et al. | 426/101 |
| 4,190,676 | 2/1980 | Göringer et al. | 426/101 |

FOREIGN PATENT DOCUMENTS

| | | | |
|---|---|---|---|
| 60-196153 | 8/1985 | Japan | 426/101 |
| 61-56045 | 3/1986 | Japan | 426/101 |
| 61-100157 | 5/1986 | Japan | 426/101 |

*Primary Examiner*—Donald E. Czaja
*Assistant Examiner*—D. Workman
*Attorney, Agent, or Firm*—Vogt & O'Donnell

[57] ABSTRACT

A low calorie coating for frozen confectionery products, which forms a skin and which provides a firm outside coating surface about the confectionery products, is formed by dipping a frozen confectionery product containing calcium ions into a flowable aqueous medium containing an alkali metal alginate to form a coating on the confectionery product and then by spraying an aqueous solution of a calcium salt onto the coating of the coated product.

15 Claims, No Drawings

COATING METHOD FOR FROZEN CONFECTIONERY PRODUCTS

BACKGROUND OF THE INVENTION

The present invention relates to a method of coating a frozen food product, more particularly a frozen confectionery product, for example, ice cream, with a coating which may contain flavours or colourants, etc.

In a coated ice cream bar, the largest portion of the calories in a typical fat based coating comes from the fat which accounts for approximately 60% of the coating and such a coating provides about 80 calories per bar. It would be desirable to substantially reduce the amount of calories in a coated ice cream bar by producing a low calorie coating containing substantially no fat.

U.S. Pat. No. 3,752,678 claims a process for the preparation of a coated frozen confectionery product comprising the steps of:

dipping the frozen confectionery product into a thixotropic gel based on a water soluble polysaccharide to form a coating adhering to the frozen confectionery product, and allowing the coating to solidify in contact with the frozen confectionery product.

The thixotropic gel may be an alginate gel containing alkali metal ions and calcium or aluminium ions. Although the coating produced by this method contains significantly fewer calories than a typical fat based coating, when the product coated is ice cream the coating tends to be rough or uneven and quickly softens and becomes slimy at room temperature.

SUMMARY OF THE INVENTION

We have devised a method of coating a frozen confectionery product with a low calorie coating which is substantially smooth and regular and forms a skin which remains firm at room temperature at least during the normal period of time required for consumption.

According to the present invention there is provided a method of coating a frozen confectionery product containing calcium ions which comprises dipping the frozen confectionery product into a flowable aqueous medium containing an alkali metal alginate to form a coating thereon, and spraying the coated product with an aqueous solution of a calcium salt.

DETAILED DESCRIPTION OF THE INVENTION

In accordance with the present invention, the frozen confectionery product containing calcium ions may be, for instance, iced milk, frozen custard, frozen mousse or ice cream.

The flowable aqueous medium is generally a solution.

The alkali metal alginate may be sodium, potassium or ammonium alginate. The amount of the alkali metal alginate in the flowable aqueous medium may vary from 0.02% to 1%, preferably 0.05% to 0.5% and especially from 0.1% to 0.3% by weight based on the total weight of the medium.

Advantageously, there may also be present in the flowable aqueous medium a low or non-calcium containing thickener such as a water soluble polysaccharide, e.g., Xanthan gum. The amount of thickener is preferably sufficient to form a gel matrix and may be from 0.1% to 1%, preferably from 0.25% to 0.75% by weight based on the weight of the aqueous medium.

Other ingredients which may be present in the flowable aqueous medium are sweeteners, flavourings or colorants, the proportions of which may be determined according to taste and/or appearance. The sweetener my be natural or artificial. One suitable sweetener is FRESHVERT R sold by the Amstar Sugar Corporation, New York. FRESHVERT R typically contains about 74% invert sugar which is a mixture of equal parts by weight of dextrose (glucose) and levulose (fructose) produced by an inversion process, about 3% sucrose and 23% bound moisture. The ingredients may be mixed by conventional methods.

The temperature of the frozen confectionery product to be coated is conveniently from $-30°$ C. to $-40°$ C. and preferably from $-32°$ C. to $-38°$ C. The temperature of the flowable aqueous medium in which the frozen product is dipped is conveniently from 0° C. to 10° C., preferably from 2° C. to 8° C. and especially from 3° C. to 6° C. The pH of the flowable aqueous medium is preferably from 4 to 7, especially from 4.5 to 6.0 and may be adjusted to the appropriate value by the addition of alkaline materials such as sodium bicarbonate.

The frozen confectionery product is dipped into the flowable aqueous medium and preferably removed almost immediately.

The calcium salt present in the spray solution may be, for instance, the acetate, citrate, tartrate, lactate, propionate or carbonate but is advantageously calcium chloride. The concentration of the calcium salt is conveniently from 0.5% to 10%, preferably from 1% to 5% and especially from 2% to 4%.

The aqueous solution of the calcium salt is conveniently at a temperature from 0° C. to 10° C., preferably from 2° C. to 8° C. and especially from 3° C. to 6° C. The solution is preferably sprayed onto the frozen confectionery product immediately after it has been removed from the flowable aqueous medium. The spraying may be carried out by conventional means e.g. a spray gun.

Although not wishing to be bound by theory, it is thought that the calcium in the confectionery product reacts with the sodium alginate in the flowable aqueous medium to form a gel on the surface of the confectionery product while the calcium salt in the spray reacts with the sodium alginate in the coating formed by dipping in the flowable aqueous medium to form a gel on the outside surface of the confectionery product.

The gel is dry to the touch within a few minutes after which the product can be placed in a wrapper.

Ice cream bars coated by the process of the present invention have only about 12-21 calories per bar.

EXAMPLES

In the following Examples, which further illustrate the present invention percentages are expressed by weight.

EXAMPLES 1 to 5

Flowable aqueous media were prepared from the ingredients indicated in Table 1 below.

TABLE 1

| Ingredients % | EXAMPLES | | | | |
| --- | --- | --- | --- | --- | --- |
| | 1 | 2 | 3 | 4 | 5 |
| Tap Water | 67.3 | 44.5 | 22.0 | 19.4 | 19.4 |
| FreshVert | 27.0 | 27.0 | 27.0 | — | — |

TABLE 1-continued

| Ingredients % | EXAMPLES | | | | |
|---|---|---|---|---|---|
| | 1 | 2 | 3 | 4 | 5 |
| Sodium alginate (Keltone HV) | 0.2 | 0.2 | 0.2 | 0.2 | 0.2 |
| Xanthan Gum (Keltrol) | 0.5 | 0.5 | 0.5 | 0.5 | 0.5 |
| Cocoa | 5.0 | — | — | — | — |
| Frozen raspberries | — | 27.8 | — | — | — |
| Frozen strawberries | — | — | 50.0 | — | — |
| Blueberry pie filling | — | — | — | 79.9 | — |
| Cinnamon'n Spice Apple pie filling | — | — | — | — | 79.9 |
| Sodium bicarbonate | — | — | 0.3 | — | — |

In each case, the liquid ingredients are first mixed in a food blender and the dry ingredients are mixed together dry and added slowly to the food blender containing liquid ingredients while running. After being thoroughly mixed, the mass is put in a large bowl, placed in a vacuum chamber and a vacuum is drawn for 3-4 minutes until most of the air is removed. Afterwards the flowable aqueous media are placed in five separate beakers and placed in a 4.5° C. cooler.

A spray is prepared by mixing calcium chloride and water in a beaker to give a 3% solution. The beaker is then placed in a 4.5° C. cooler.

Ice cream bars at −37° C. are first dipped quickly into the flowable aqueous media respectively. The bottom of each bar is then dragged across the beaker to remove excess coating and the coated bars are sprayed with the calcium chloride solution by means of an air spray gun immediately after removal of the bars from the flowable aqueous media.

The coating dries after 1.5 minutes and the coated ice cream bars are placed in bags and stored in a freezer at about −38° C.

The total fat content of a dipped ice cream bar is reduced by about 67% when compared with an ice cream bar with a typical fat based coating.

The calorie content of the coatings for each bar was as follows:

| Example | Calorie content |
|---|---|
| 1 | 12 |
| 2 | 17 |
| 3 | 21 |
| 4 | 19 |
| 5 | 16 |

We claim:

1. A process for coating a frozen confectionery product which comprises:
    dipping a frozen confectionery product containing calcium ions into a flowable aqueous medium containing an alkali metal alginate to form a coating on the frozen confectionery product, and
    spraying an aqueous solution of a calcium salt onto the coating of the coated product.

2. A process according to claim 1 wherein the alkali metal alginate is sodium alginate.

3. A process according to claim 1 wherein the alkali metal alginate in the flowable aqueous medium is in an amount of from 0.02% to 1% by weight based on a total weight of the aqueous medium.

4. A process according to claim 1 wherein the flowable aqueous medium further contains Xanthan gum in an amount of from 0.1% to 1% by weight based upon a total weight of the aqueous medium.

5. A process according to claim 1 wherein the flowable aqueous medium further contains an ingredient selected from the group and mixtures thereof consisting of sweeteners, flavourings and colourants.

6. A process according to claim 1 wherein the flowable aqueous medium has a temperature of from 0° C. to 10° C.

7. A process according to claim 1 wherein the flowable aqueous medium has a pH of from 4.5 to 6.0.

8. A process according to claim 1 wherein the calcium salt of the aqueous solution is calcium chloride.

9. A process according to claim 1 wherein the calcium salt in the aqueous solution has a concentration of from 0.5% to 10%.

10. A process according to claim 1 wherein the aqueous solution of the calcium salt has and is sprayed at a temperature of from 0° C. to 10° C.

11. A process according to claim 1 wherein the frozen confectionery product to be coated has a temperature of from −30° C. to −40° C.

12. A process according to claim 1 wherein the aqueous solution of calcium salt is sprayed onto the coating of the coated product immediately after the coated product has been removed from the flowable aqueous medium.

13. A process according to claim 1 wherein the frozen confectionery product to be coated has a temperature of from −40° C., the flowable aqueous medium has a temperature of from 0° C. −30° C. to 10° C. and the aqueous solution of the calcium salt has and is sprayed at a temperature of from 0° C. to 10° C.

14. A process according to claim 13, wherein the flowable aqueous medium has a pH of from 4.5 to 6.0.

15. A process according to claim 13 wherein the alkali metal alginate in the flowable aqueous medium is in an amount of from 0.02% to 1% by weight based upon a total weight of the aqueous medium and the calcium salt in the aqueous solution has a concentration of from 0.5% to 10%.

* * * * *

UNITED STATES PATENT AND TRADEMARK OFFICE
CERTIFICATE OF CORRECTION

PATENT NO. : 4,985,263

DATED : January 15, 1991

INVENTOR(S) : David M. KLUG, et al.

It is certified that error appears in the above-identified patent and that said Letters Patent is hereby corrected as shown below:

Column 2, line 58, insert a comma after "invention".

Column 4, line 42 [line 3 of claim 13], after "from", insert -- -30° C to --.

Column 4, line 43 [line 4 of claim 13], after "0° C.", delete "-30° C.".

Signed and Sealed this

Twelfth Day of May, 1992

Attest:

DOUGLAS B. COMER

Attesting Officer

Acting Commissioner of Patents and Trademarks